(12) United States Patent
Bartlett et al.

(10) Patent No.: US 11,022,868 B2
(45) Date of Patent: *Jun. 1, 2021

(54) PROJECTOR WITH LASER AND PHOSPHOR

(71) Applicant: TEXAS INSTRUMENTS INCORPORATED, Dallas, TX (US)

(72) Inventors: Terry Alan Bartlett, Dallas, TX (US); William M. Bommersbach, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/002,156

(22) Filed: Aug. 25, 2020

(65) Prior Publication Data
US 2020/0387060 A1    Dec. 10, 2020

Related U.S. Application Data

(63) Continuation of application No. 16/507,687, filed on Jul. 10, 2019, now Pat. No. 10,768,516.
(Continued)

(51) Int. Cl.
*G03B 21/14* (2006.01)
*G03B 21/20* (2006.01)
(Continued)

(52) U.S. Cl.
CPC ....... *G03B 21/2033* (2013.01); *G02B 26/008* (2013.01); *G03B 21/204* (2013.01); *H04N 9/3111* (2013.01)

(58) Field of Classification Search
CPC .. G03B 21/14; G03B 21/204; G03B 21/2033; G03B 26/008; G03B 26/08; G03B 26/0891; G03B 9/31; G03B 9/3111
See application file for complete search history.

(56) References Cited

U.S. PATENT DOCUMENTS

| | | | |
|---|---|---|---|
| 5,729,383 A | 3/1998 | Chastang et al. | |
| 5,774,179 A | 6/1998 | Chevrette et al. | |
| (Continued) | | | |

FOREIGN PATENT DOCUMENTS

| | | |
|---|---|---|
| CN | 207601490 U | 7/2018 |
| JP | 2011170363 | 9/2011 |

OTHER PUBLICATIONS

Search Report for PCT/US2020/17514 dated May 28, 2020, 2 pages.

*Primary Examiner* — William C. Dowling
(74) *Attorney, Agent, or Firm* — Michelle F. Murray; Charles A. Brill; Frank D. Cimino

(57) ABSTRACT

A projector includes a laser light source and a glass wheel. The laser source is configured to generate laser light. The glass wheel is optically coupled to the laser source. The glass wheel includes a first surface and a second surface. The first surface is configured to receive the laser light, and includes a light direction device optically coupled to the laser source. The second surface is opposite the first surface and is configured to emit light. The second surface includes a first arc of a phosphor deposited at a first distance from a center of the glass wheel. The light direction device is configured to direct the laser light to the first arc of the phosphor. The second surface also includes a second arc of the phosphor deposited at a second distance from the center of the glass wheel.

20 Claims, 6 Drawing Sheets

Related U.S. Application Data

(60) Provisional application No. 62/803,230, filed on Feb. 8, 2019.

(51) Int. Cl.
  *H04N 9/31* (2006.01)
  *G02B 26/00* (2006.01)

(56) References Cited

U.S. PATENT DOCUMENTS

| | | |
|---|---|---|
| 5,798,875 A | 8/1998 | Fortin et al. |
| 5,909,323 A | 6/1999 | Blake et al. |
| 6,636,368 B2 | 10/2003 | Ohtaka |
| 6,850,352 B1 | 2/2005 | Childers |
| 6,985,278 B2 | 1/2006 | Chu et al. |
| 7,113,231 B2 | 9/2006 | Conner et al. |
| 7,336,290 B2 | 2/2008 | Marshall et al. |
| 9,860,495 B2 | 1/2018 | Smith |
| 2002/0118375 A1 | 8/2002 | Ramanujan et al. |
| 2005/0083511 A1 | 4/2005 | Markle |
| 2005/0145806 A1 | 7/2005 | Marshall |
| 2005/0259227 A1 | 11/2005 | Choi et al. |
| 2006/0017887 A1 | 1/2006 | Jacobson et al. |
| 2006/0056076 A1 | 3/2006 | Araki et al. |
| 2006/0176323 A1 | 8/2006 | Bommersbach et al. |
| 2014/0253882 A1 | 9/2014 | King et al. |
| 2015/0036106 A1 | 2/2015 | Nagahara |
| 2016/0291315 A1 | 10/2016 | Hsu |
| 2017/0242241 A1 | 8/2017 | Nojima |
| 2019/0249833 A1 | 8/2019 | Hsu et al. |
| 2019/0250489 A1 | 8/2019 | Ikeda |
| 2020/0026171 A1 | 1/2020 | Hsieh et al. |
| 2020/0045273 A1 | 2/2020 | Bartlett |
| 2020/0081176 A1 | 3/2020 | Bartlett et al. |

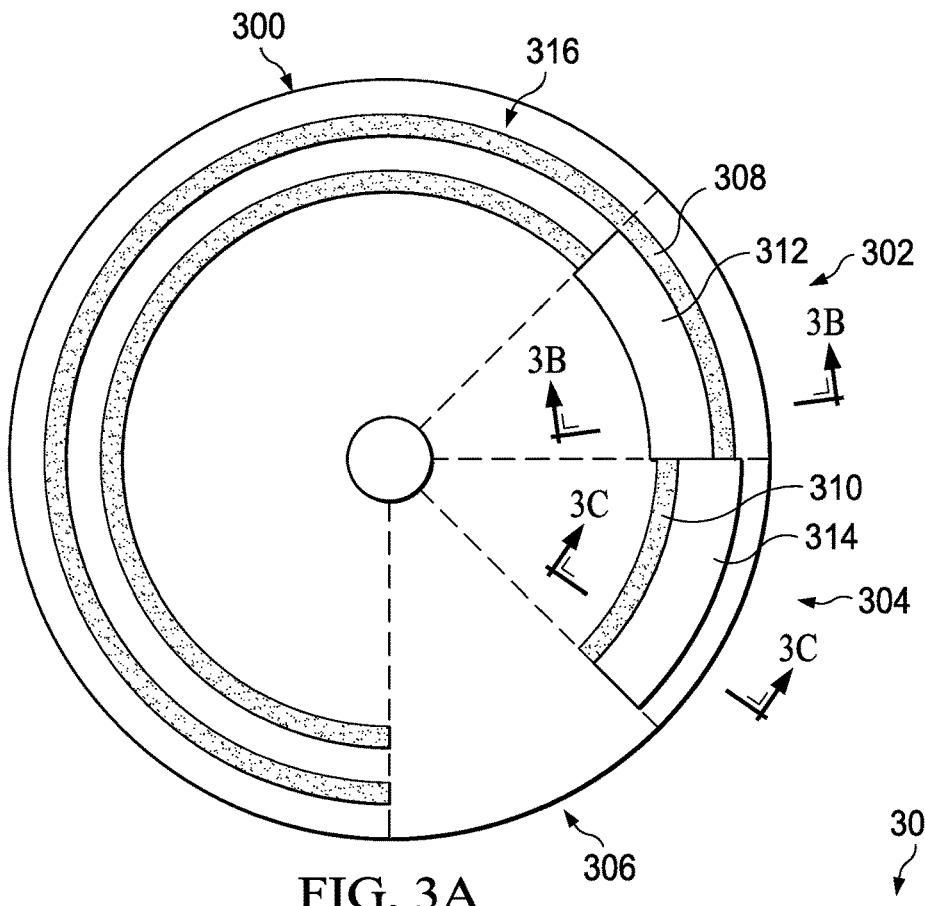
FIG. 3A
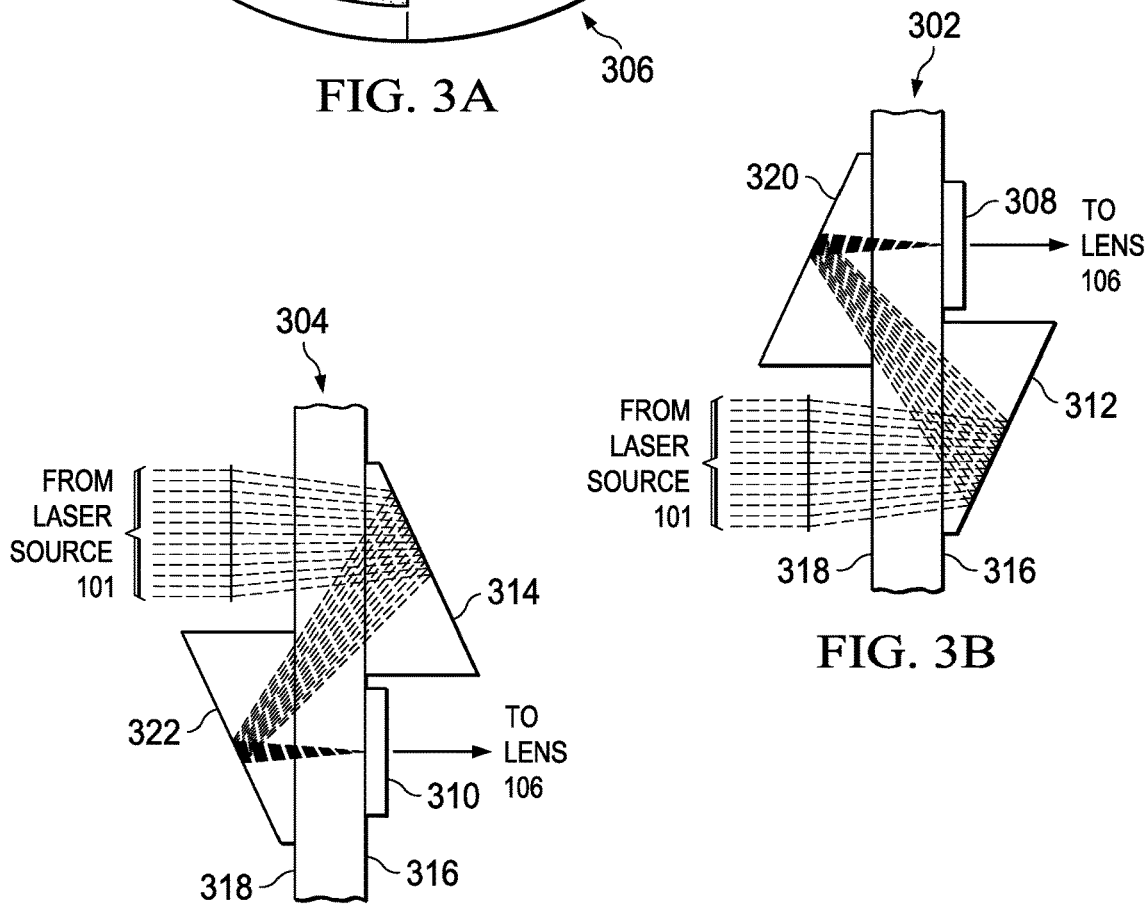
FIG. 3B
FIG. 3C

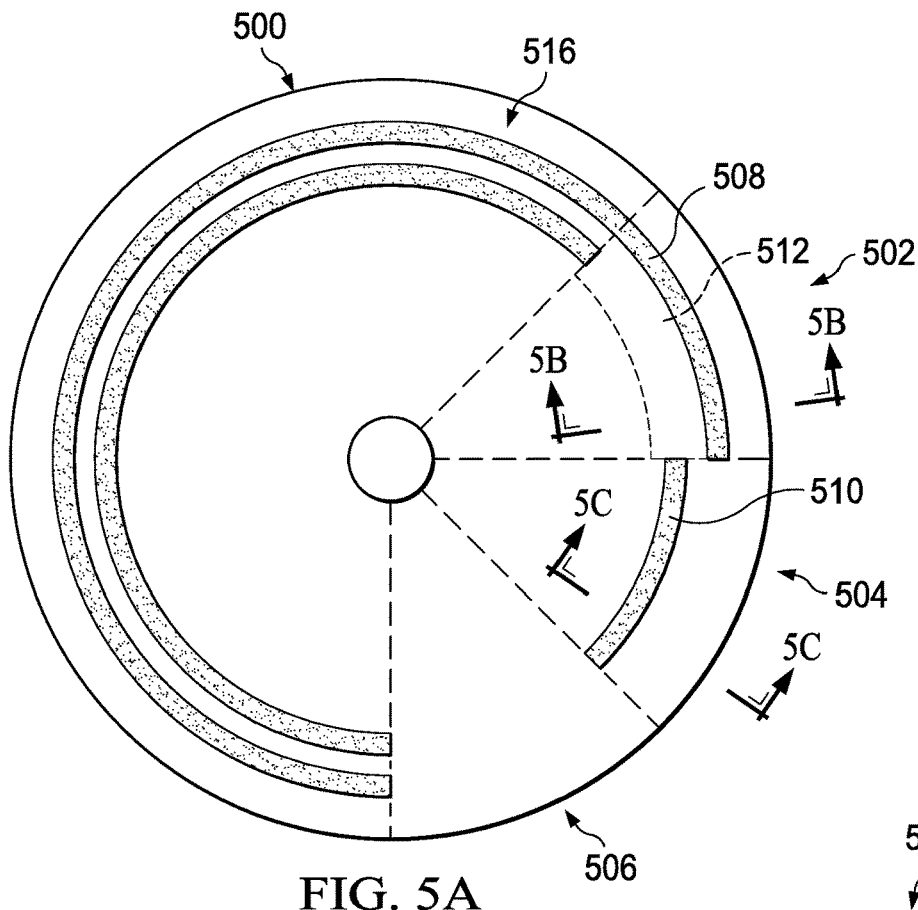
FIG. 5A
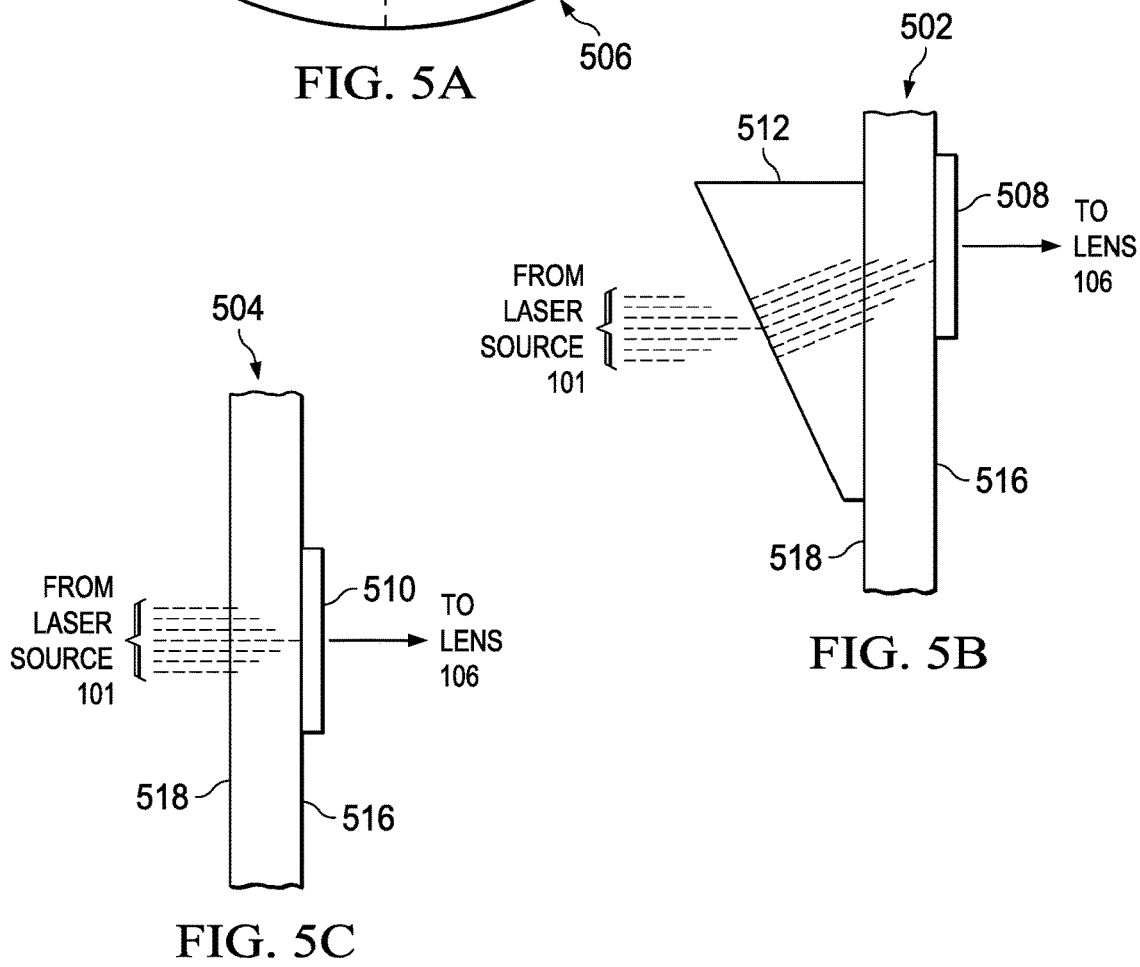
FIG. 5B
FIG. 5C

PROJECTOR WITH LASER AND PHOSPHOR

CROSS-REFERENCE TO RELATED APPLICATIONS

This application is a continuation of U.S. patent application Ser. No. 16/507,687 filed Jul. 10, 2019, which claims priority to U.S. Provisional Patent Application No. 62/803,230 filed Feb. 8, 2019, which applications are hereby incorporated herein by reference in their entireties.

BACKGROUND

Some spatial light modulator (SLM) based projection systems can generate a displayed image having a higher resolution (greater pixel density) than the SLM used to generate the displayed image. For example, an SLM-based projector may include a moving glass plate interposed in the light path after the light has been modulated by the SLM. An actuator moves the plate so that, in one position, the output of the projector shifts by one-half pixel in both the x and y directions. This shift places the center of the shifted pixels at the intersection of four of the unshifted pixels. The output of the SLM alternates between the pixel information for unshifted and shifted pixels rapidly enough that the eye sees the combination of the unshifted and shifted pixels as an image having double the resolution of the SLM. This technique may be extended to further increase the resolution of the displayed image by moving the glass plate to more sub-pixel positions (e.g., four positions).

SUMMARY

A spatial light modulator (SLM) based projector that provides improved image resolution by generating offset beams using a phosphor wheel is disclosed herein. In one example, a projector includes a laser light source and a glass wheel. The glass wheel is optically coupled to the laser source, and includes a first surface and a second surface. The first surface includes a first arc of a phosphor deposited at a first distance from a center of the glass wheel, and a second arc of the phosphor deposited at a second distance from the center of the glass wheel. The second surface is opposite the first surface, and includes a light direction device optically coupled to the laser source and the first arc of the phosphor.

In another example, a projector includes a laser light source and a glass wheel. The laser source is configured to generate laser light. The glass wheel is optically coupled to the laser source. The glass wheel includes a first surface and a second surface. The first surface is configured to receive the laser light, and includes a light direction device optically coupled to the laser source. The second surface is opposite the first surface and is configured to emit light. The second surface includes a first arc of a phosphor deposited at a first distance from a center of the glass wheel. The light direction device is configured to direct the laser light to the first arc of the phosphor. The second surface also includes a second arc of the phosphor deposited at a second distance from the center of the glass wheel.

In a further example, a method for projection includes generating laser light, and rotating a glass wheel in a path of the laser light. The laser light illuminates a first arc of a phosphor in a first sector of the glass wheel to generate a first beam. The laser light illuminates a second arc of the phosphor, that is offset from the first arc of phosphor, in a second sector of the glass wheel to generate a second beam that is offset from the first beam.

BRIEF DESCRIPTION OF THE DRAWINGS

For a detailed description of various examples, reference will now be made to the accompanying drawings in which:

FIGS. 3A-3C show an example glass wheel that includes prisms for directing laser light to multiple locations in accordance with this description;

FIGS. 5A-5C show an example glass wheel that includes a glass wedge for directing laser light to multiple locations in accordance with this description.

DETAILED DESCRIPTION

In this description, the term "couple" or "couples" means either an indirect or direct wired or wireless connection. Thus, if a first device couples to a second device, that connection may be through a direct connection or through an indirect connection via other devices and connections. Also, in this description, the recitation "based on" means "based at least in part on." Therefore, if X is based on Y, then X may be a function of Y and any number of other factors.

The optics and the actuator for using a moving glass plate to increase the resolution of a spatial light modulator (SLM) based projector are not compact, and therefore not suitable for compact applications, such as pico-projectors. In addition, an actuator capable of high speed and precise operation is costly. To reduce cost and complexity, some SLM-based projectors employ multiple light sources to generate the multiple sub-pixels of an enhanced resolution display. In such systems, the light sources are sequentially enabled to generate the corresponding sub-pixels. Such operation is inefficient when using laser light sources because multiple laser sources are required, and the laser sources are discontinuously enabled.

The SLM-based projectors disclosed herein direct laser light between two or more positions to provide the appearance of laser light generated by two or more sequentially enabled laser sources. The projectors include a glass wheel with arcs of phosphor at different radial distances from the center of the wheel. As the wheel rotates, optical elements attached to the wheel direct the laser light to the different arcs of phosphor. In various implementations, the optical elements include prisms, diffractive optical elements, or a glass wedge. The diffractive optical elements may include a holographic optical element. Some implementations use a blue laser source to illuminate the arcs of phosphor on the wheel. Light emitted by the phosphor is filtered to produce red light and green light that are combined with the blue light to provide an image.

Figure 1:
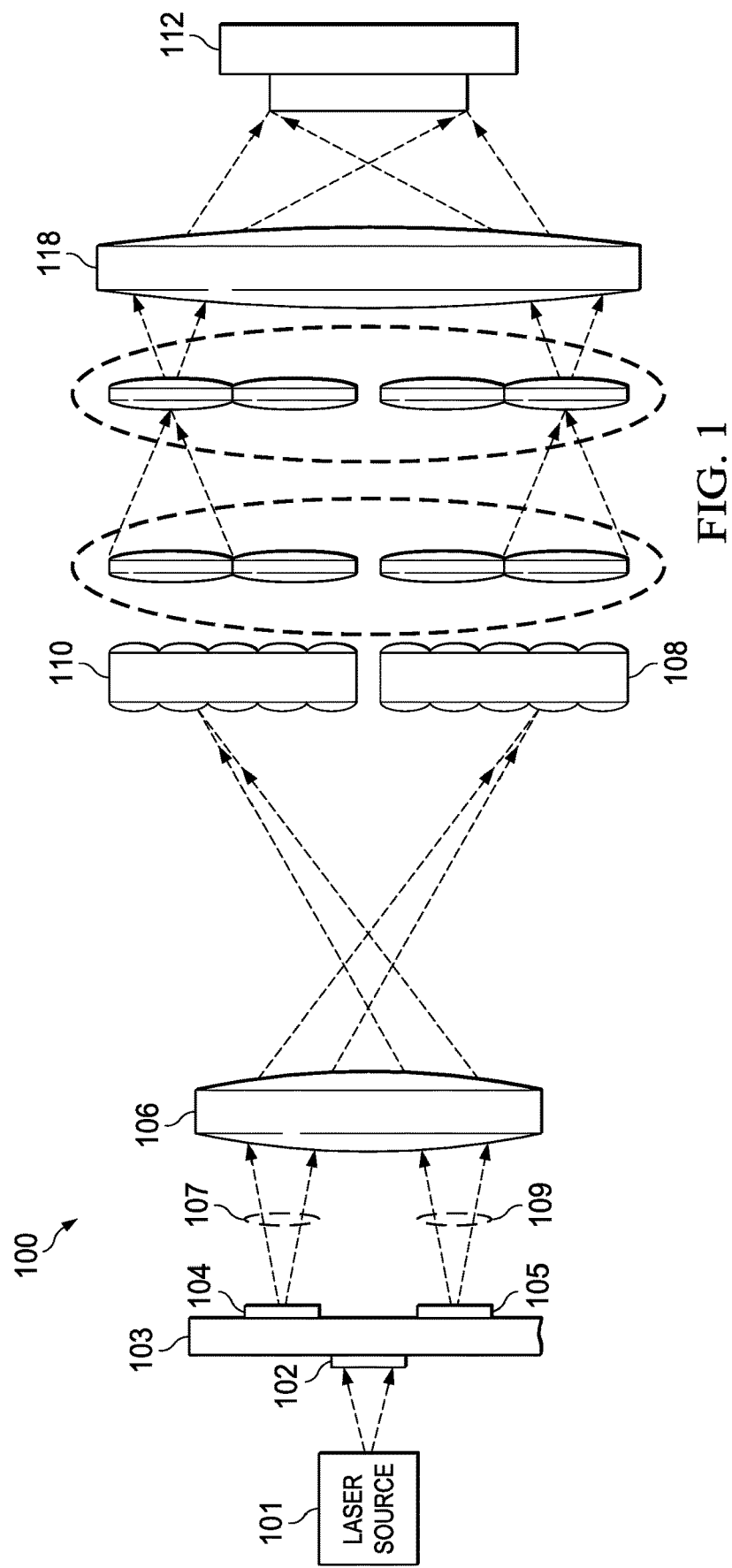
FIG. 1 shows an example light generation path for a spatial light modulator (SLM) based projector in accordance with this description.

FIG. 1 shows an example light generation path 100 for an SLM-based projector in accordance with this description. The light generation path 100 includes a laser source 101, a glass wheel 103, a lens 106, a fly's eye array 108, a fly's eye array 110, a lens 118, and an SLM 112. The laser source 101 may be a laser diode, a vertical cavity surface emitting laser (VCSEL), or other device that emits laser light. In some implementations of the light generation path 100, the laser source 101 emits blue laser light. Laser light emitted by the laser source 101 is projected onto the glass wheel 103.

The glass wheel 103 receives the laser light projected by the laser source 101 and directs the laser light to form beam 107 or beam 109 emitted from the glass wheel 103. The glass wheel 103 includes an arc of phosphor 104, an arc of phosphor 105, and a light direction device 102. The arc of phosphor 104 and the arc of phosphor 105 may absorb the laser light projected by the laser source 101 and emit yellow or other color of light as the beams 107 and 109. The beams 107 and 109 emitted by the arc of phosphor 104 and the arc of phosphor 105 may be filtered to produce red and green light. For example, the beams 107 and 109 may be filtered with a thin-film dichroic coating deposited on the surface of the phosphor, or on the glass wheel 103 after the phosphor emission, or in a separate color wheel (not shown) in the light generation path 100 to produce red and green light.

The arc of phosphor 104 is disposed at a first offset from the center of the glass wheel 103. The arc of phosphor 105 is concentric with the arc of phosphor 104 and is disposed at a second offset from the center of the glass wheel 103. The second offset is different from the first offset. The light direction device 102 receives the laser light projected by the laser source 101, and directs the received laser light to one of the arc of phosphor 104 or the arc of phosphor 105. For example, in a first sector of the laser source 101, a first instance of the light direction device 102 directs the laser light to the arc of phosphor 104, and in a second sector of the laser source 101, a second instance of the light direction device 102 directs the laser light to the arc of phosphor 105. Thus, the glass wheel 103 is rotated (e.g., by an electric motor), and produces offset beams 107 and 109, at different positions of rotation, from the laser light generated by the laser source 101.

The beams 107 and 109 pass through the lens 106. The lens 106 may be a single lens or a system of lenses. Light projection lines in the figures are schematic and do not show the complete path of the light but show the general path of the light. The lens 106 focuses the beam 107 and the beam 109 onto the fly's eye array 108 and the fly's eye array 110, respectively. The fly's eye array 108 and the fly's eye array 110 include many small lenses. These arrays may include dozens or thousands of small lenses. The purpose of these lenses is to homogenize or "even out" the light to provide uniform light. In the light generation path 100, two fly's eye arrays enhance the geometric separation of the two light paths from the glass wheel 103. However, one fly's eye array may be used for both paths in some implementations of the light generation path 100. The light output by the fly's eye array 108 and the fly's eye array 110 passes through the lens 118 to the SLM 112. The lens 118 may be a single lens or a group of lenses.

The SLM 112 is a digital micromirror device (DMD) in some implementations of the light generation path 100. In some implementations of the light generation path 100, the SLM 112 may be a liquid crystal on silicon (LCOS) SLM or other device. The lens 106, the fly's eye array 108, the fly's eye array 110 and the lens 118 preserve an angular difference to the light beams provided by glass wheel 103 so that the light from the glass wheel 103 is incident on the SLM 112 at different angles.

Figure 2:
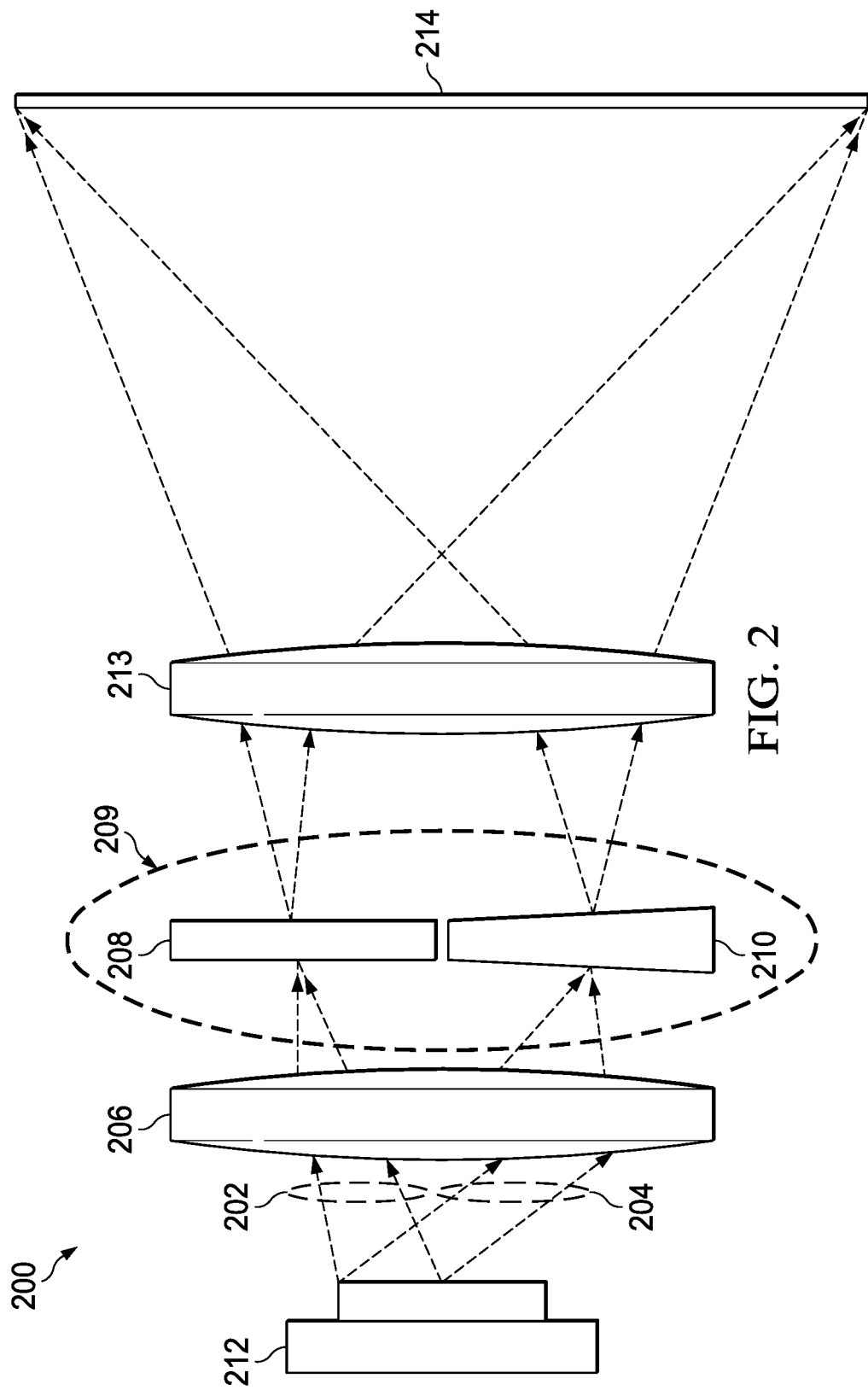
FIG. 2 shows an example projection path for an SLM based projector in accordance with this description.

FIG. 2 shows an example projection path 200 for an SLM based projector in accordance with this description. The projection path 200 includes an SLM 212, a lens 206, a glass plate 208, a glass plate 210, and a lens 213. The SLM 212 may be the SLM 112 of the light generation path 100. The lens 206 focuses modulated light 202 onto the glass plate 208. The lens 206 also focuses modulated light 204 onto the glass plate 210. The glass plate 208 and the glass plate 210 provide an image direction device 209. In this example, the glass plate 208 is a flat glass plate that does not significantly modify the modulated light 202, and the glass plate 210 is a trapezoidal plate (also known as a wedge prism) that shifts the pixel position of the modulated light 204 one-half pixel in the horizontal direction (x direction) and one-half pixel in the vertical direction (y direction). The lens 213 projects the modulated light 202 from the glass plate 208 and the modulated light 204 from the glass plate 210 onto a target 214. In this example, the target 214 is a projection screen.

FIGS. 3A-3C show views of an example glass wheel 300 that includes prisms for directing laser light to multiple locations in accordance with this description. The glass wheel 300 is an implementation of the glass wheel 103. FIG. 3A shows a view of a side 316 the glass wheel 300. The glass wheel 300 includes a sector 302, a sector 304, and a sector 306. More than one of the sector 302, the sector 304, and the sector 306 may be provided on the glass wheel 300. The sector 302 includes an arc of phosphor 308 and a prism 312. The prism 312 is a light direction device. The sector 304 includes an arc of phosphor 310 and a prism 314. The arc of phosphor 310 is concentric with the arc of phosphor 308, and offset from the arc of phosphor 308 with respect to the center of the glass wheel 300. The sector 306 lacks the arc of phosphor 308 and the arc of phosphor 310, and may include an instance of the prism 312 or the prism 314. For example, a first instance of the sector 306 includes the prism 312, and a second instance of the sector 306 includes the prism 314.

FIG. 3B shows a cross-sectional view of the glass wheel 300 taken through the sector 302. As shown in FIG. 3B, the glass wheel 300 includes a side 318 opposite the side 316. A prism 320 is disposed on the side 318 opposite the arc of phosphor 308. FIG. 3B shows a path of laser light in the sector 302. The laser light passes through the glass wheel 300 and is reflected by the prism 312 to the prism 320. The outside surfaces of prisms 312, 320, 314, and 322 are coated with a reflective material or thin film stack that is highly reflective. The prism 320 reflects the laser light received via the prism 312 to the arc of phosphor 308. The arc of phosphor 308 absorbs the laser light reflected by the prism 320, and emits a beam of light directed to the lens 106. The prisms 312 and 320 may be formed as arcs that follow the arc of phosphor 308, and may be attached to the glass wheel 300 by adhesive or molded into the glass wheel 300 in various implementations.

FIG. 3C shows a cross-sectional view of the glass wheel 300 taken through the sector 304. A prism 322 is disposed on the side 318 opposite the arc of phosphor 310. FIG. 3C shows a path of laser light in the sector 304. The laser light passes through the glass wheel 300 and is reflected by the prism 314 to the prism 322. The prism 322 reflects the laser light received via the prism 314 to the arc of phosphor 310. The arc of phosphor 310 absorbs the laser light reflected by the prism 322, and emits a beam of light directed to the lens 106. The prisms 314 and 323 may be formed as arcs that follow the arc of phosphor 310, and may be attached to the glass wheel 300 by adhesive or molded into the glass wheel 300 in various implementations. Because the arc of phosphor 308 and the arc of phosphor 310 are disposed at different offsets from the center of the glass wheel 300, the light beams produced by the arc of phosphor 308 and the arc of phosphor 310 are offset.

Figure 4A:
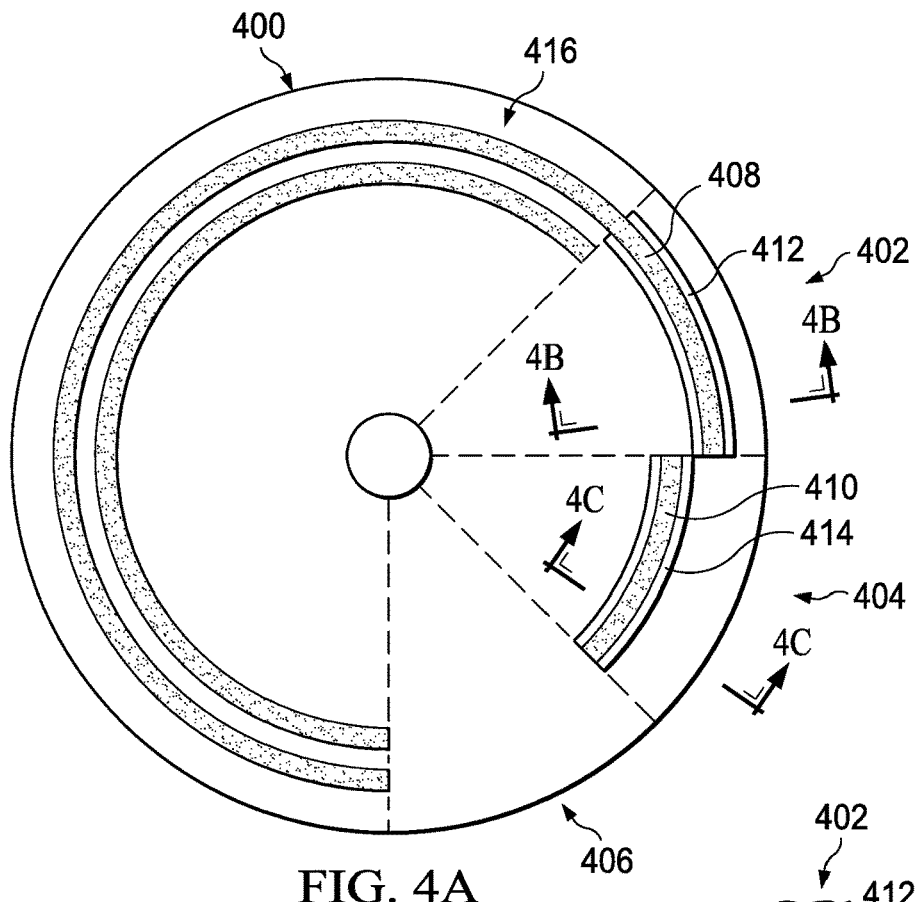
FIGS. 4A-4C show an example glass wheel that includes diffractive optical elements for directing laser light to multiple locations in accordance with this description.
Figure 4B:
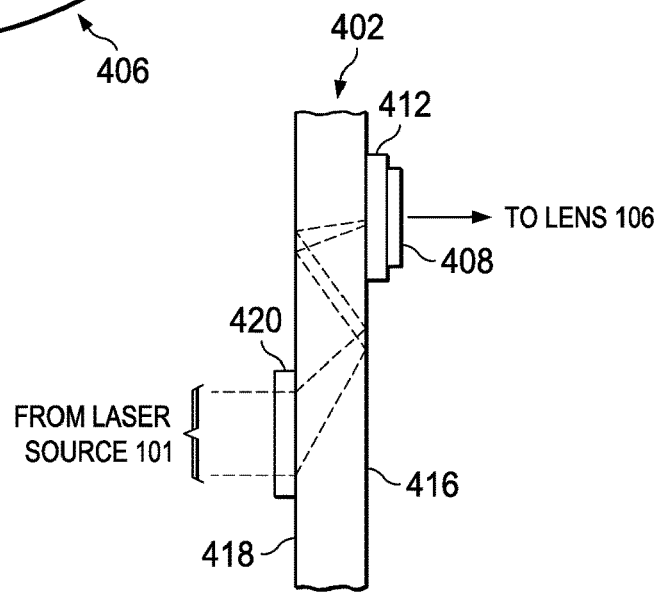
Figure 4C:
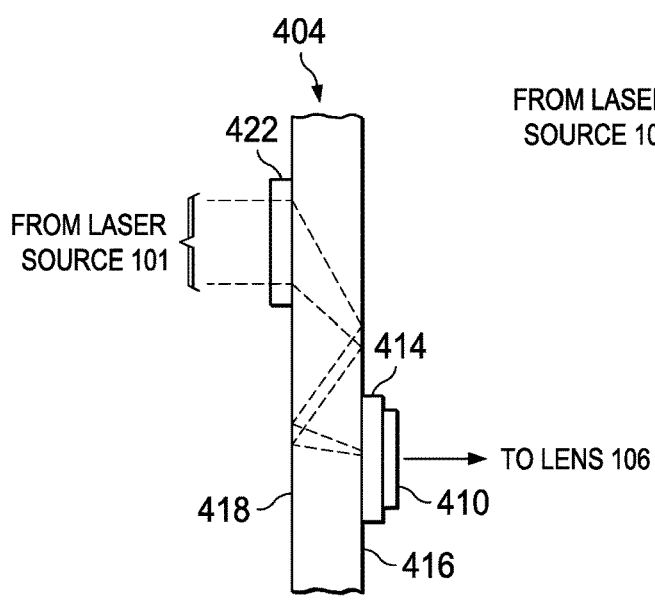

FIGS. 4A-4C show an example glass wheel 400 that includes diffractive optical elements for directing laser light to multiple locations in accordance with this description. The glass wheel 400 is an implementation of the glass wheel 103. FIG. 4A shows a view of a side 416 the glass wheel 400. The glass wheel 400 includes a sector 402, a sector 404, and a sector 406. More than one of the sector 402, the sector 404, and the sector 406 may be provided on the glass wheel 400. The sector 402 includes an arc of phosphor 408 and a diffractive optical element 412. The diffractive optical element 412 is a light direction device which may be a surface diffraction grating or a volume Bragg grating. The sector 404 includes an arc of phosphor 410 and a diffractive optical element 414. The arc of phosphor 410 is concentric with the arc of phosphor 408, and offset from the arc of phosphor 408 with respect to the center of the glass wheel 400. The sector 406 lacks the arc of phosphor 408 and the arc of phosphor 410, and may include an instance of the diffractive optical element 412 or the diffractive optical element 414. For example, a first instance of the sector 406 includes the diffractive optical element 412, and a second instance of the sector 406 includes the diffractive optical element 414.

FIG. 4B shows a cross-sectional view of the glass wheel 400 taken through the sector 402. As shown in FIG. 4B, the glass wheel 400 includes a side 418 opposite the side 416. A diffractive optical element 420 is disposed on the side 418. FIG. 4B show a path of laser light in the sector 402. The laser light is incident on and is diffracted by the diffractive optical element 420 into the glass wheel 400. The laser light propagates in the glass wheel 400 by total internal reflection until the laser light reaches the diffractive optical element 412. The diffractive optical element 412 is disposed beneath the arc of phosphor 408. The diffractive optical element 412 diffracts the laser light to the arc of phosphor 408. The arc of phosphor 308 absorbs the laser light diffracted by the diffractive optical element 412, and emits a beam of light directed to the lens 106. The diffractive optical element 412 and 420 may be formed as arcs that follow the arc of phosphor 408, and may be attached to the glass wheel 400 by adhesive or molded into the glass wheel 400 in various implementations.

FIG. 4C shows a cross-sectional view of the glass wheel 400 taken through the sector 404. A diffractive optical element 422 is disposed on the side 418. FIG. 4C show a path of laser light in the sector 404. The laser light is incident on and is diffracted by the diffractive optical element 422 into the glass wheel 400. The laser light propagates in the glass wheel 400 by total internal reflection until the laser light reaches the diffractive optical element 414. The diffractive optical element 414 is disposed beneath the arc of phosphor 410. The diffractive optical element 414 diffracts the laser light to the arc of phosphor 410. The arc of phosphor 410 absorbs the laser light diffracted by the diffractive optical element 414, and emits a beam of light directed to the lens 106. The diffractive optical element 414 and 422 may be formed as arcs that follow the arc of phosphor 410, and may be attached to the glass wheel 400 by adhesive or molded into the glass wheel 400 in various implementations. Because the arc of phosphor 408 and the arc of phosphor 410 are disposed at different offsets from the center of the glass wheel 400, the light beams produced by the arc of phosphor 408 and the arc of phosphor 410 are offset.

The diffractive optical element 412, the diffractive optical element 414, the diffractive optical element 420, and/or the diffractive optical element 422 may be holographic optical elements in some implementations of the glass wheel 400.

FIGS. 5A-5C show an example glass wheel 500 that includes a glass wedge for directing laser light to multiple locations in accordance with this description. The glass wheel 500 is an implementation of the glass wheel 103. FIG. 5A shows a view of a side 516 the glass wheel 500. The glass wheel 500 includes a sector 502, a sector 504, and a sector 506. More than one of the sector 502, the sector 504, and the sector 506 may be provided on the glass wheel 500. The sector 502 includes an arc of phosphor 508 disposed on the side 516, and a glass wedge 512 disposed on a side 518 of the glass wheel 500. The side 518 (see FIG. 5B) is opposite the side 516 on which the arc of phosphor 508 is disposed. The glass wedge 512 is a light direction device. The sector 504 includes an arc of phosphor 510. The arc of phosphor 510 is concentric with the arc of phosphor 508, and offset from the arc of phosphor 508 with respect to the center of the glass wheel 500. The sector 506 lacks the arc of phosphor 508 and the arc of phosphor 510, and may include an instance of the glass wedge 512. For example, a first instance of the sector 506 includes the glass wedge 512, and a second instance of the sector 506 lacks the glass wedge 512.

FIG. 5B shows a cross-sectional view of the glass wheel 500 taken through the sector 502. As shown in FIG. 5B, the glass wheel 500 includes a side 518 opposite the side 516. The glass wedge 512 is disposed on the side 518 opposite the arc of phosphor 508. FIG. 5B shows a path of laser light in the sector 502. The laser light passes through and is refracted by the glass wedge 512 to the arc of phosphor 508. The arc of phosphor 508 absorbs the laser light refracted by the glass wedge 512, and emits a beam of light directed to the lens 106. The glass wedge 512 may be formed as an arc that follows the arc of phosphor 508, and may be attached to the glass wheel 500 by adhesive or molded into the glass wheel 500 in various implementations.

FIG. 5C shows a cross-sectional view of the glass wheel 500 taken through the sector 504. The sector 504 lacks the glass wedge 512 or any light direction device. FIG. 5C shows a path of laser light in the sector 504. The laser light is incident on and passes directly through the glass wheel 500 to the arc of phosphor 510. The arc of phosphor 510 absorbs the laser light, and emits a beam of light directed to the lens 106. Because the arc of phosphor 508 and the arc of phosphor 510 are disposed at different offsets from the center of the glass wheel 500, the light beams produced by the arc of phosphor 508 and the arc of phosphor 510 are offset.

Figure 6:
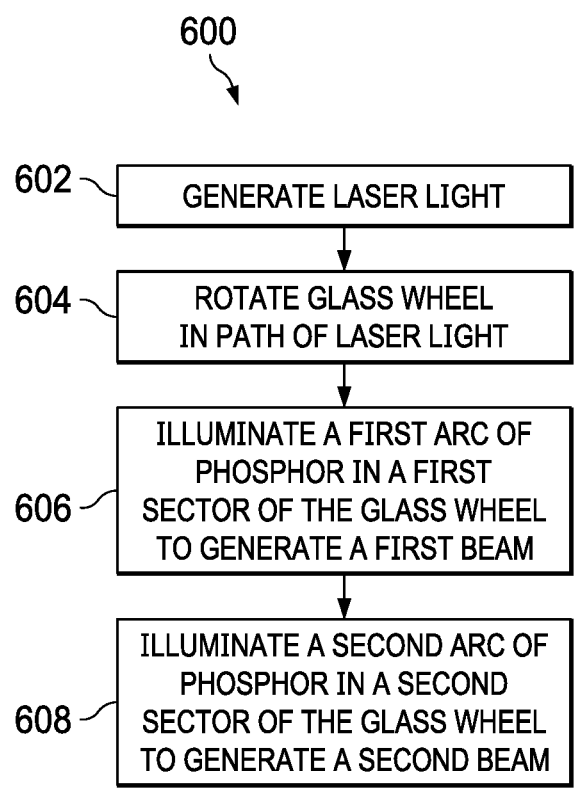
FIG. 6 shows a flow diagram for a method for using a glass wheel to direct laser light to multiple locations in accordance with this description.

FIG. 6 shows a flow diagram for a method 600 for using a glass wheel to direct laser light to multiple locations in accordance with this description. Though depicted sequentially as a matter of convenience, at least some of the actions shown can be performed in a different order and/or performed in parallel. Additionally, some implementations may perform only some of the actions shown. Operations of the method 600 may be performed by a projector that includes an implementation of the light generation path 100.

In block 602, the laser source 101 generates laser light. For example, the laser source 101 generates blue laser light.

In block 604, the glass wheel 103 is rotated in the path of the laser light generated by the laser source 101. For example, an electric motor is energized to rotate the glass wheel 103.

In block 606, a first arc of phosphor 104 disposed in a first sector of the glass wheel 103 is illuminated by the laser light.

The phosphor arc of phosphor 104 absorbs the laser light and emits a first beam. The laser light is received at a first radial offset of the glass wheel 103, and emitted from the glass wheel 103 at a second radial offset of the glass wheel 103. The second radial offset is different from the first radial offset. The laser light may be radially propagated in the glass wheel 103 by reflecting the laser light in the prism 312 and the prism 320 to the first arc of phosphor 104, by diffracting the laser light in a first diffractive optical element 420 and a second diffractive optical element 412 to the first arc of phosphor 104, or by refracting the laser light in a glass wedge 512 to the first arc of phosphor 104.

In block 608, glass wheel 103 is rotated such the laser light is incident on a second sector of the glass wheel 103. A second arc of phosphor 105 disposed in the second sector of the glass wheel 103 is illuminated by the laser light. The arc of phosphor 105 absorbs the laser light and emits a second beam that is spatially offset from the first beam produced in block 606. In some implementations, the laser light is received at a first radial offset of the glass wheel 103, and emitted from the glass wheel 103 at a second radial offset of the glass wheel 103, where the second radial offset is different from the first radial offset. In some implementations, the laser light may pass directly through the glass wheel 103 to the arc of phosphor 105. In some implementations, the laser light may be radially propagated in the glass wheel 103 by reflecting the laser light in the prism 314 and the prism 322 to the second arc of phosphor 105, or by diffracting the laser light in a first diffractive optical element 422 and a second diffractive optical element 414 to the second arc of phosphor arc of phosphor 105.

Modifications are possible in the described embodiments, and other embodiments are possible, within the scope of the claims.

What is claimed is:

1. An apparatus comprising:
   a light source; and
   a wheel optically coupled to the light source, the wheel having a center, the wheel comprising:
      a first arc of phosphor a first distance from the center;
      a second arc of phosphor a second distance from the center; and
      a light direction device optically coupled to the light source.

2. The apparatus of claim 1, wherein:
   the light direction device is a first light direction device; and
   the wheel further comprises a second light direction device optically coupled to the light source and to the second arc of phosphor.

3. The apparatus of claim 2, wherein the second light direction device comprises:
   a first prism; and
   a second prism optically coupled to the first prism.

4. The apparatus of claim 2, wherein the second light direction device comprises:
   a first diffractive optical element; and
   a second diffractive optical element optically coupled to the first diffractive optical element.

5. The apparatus of claim 1, wherein the light direction device comprises:
   a first prism; and
   a second prism optically coupled to the first prism.

6. The apparatus of claim 1, wherein the light direction device comprises:
   a first diffractive optical element; and
   a second diffractive optical element optically coupled to the first diffractive optical element.

7. The apparatus of claim 1, wherein the light direction device comprises a wedge.

8. The apparatus of claim 1, wherein the wheel comprises a sector lacking the first arc of phosphor and the second arc of phosphor.

9. A wheel having a center, a first surface, and a second surface opposite the first surface, the wheel comprising:
   a light direction device on the first surface, the light direction device configured to receive light;
   a first arc of phosphor on the second surface, the first arc of phosphor a first distance from the center, wherein the light direction device is configured to direct the light to the first arc of phosphor; and
   a second arc of phosphor on the second surface a second distance from the center.

10. The wheel of claim 9, wherein the light is first light, the light direction device is a first light direction device, the wheel further comprising:
    the second surface of the wheel comprises a second light direction device configured to receive second light, wherein the second light direction device is configured to direct the light to the second arc of phosphor.

11. The wheel of claim 10, wherein the second light direction device comprises:
    a first prism disposed on the second surface of the wheel; and
    a second prism disposed on the first surface of the wheel;
    wherein the second prism is configured to direct the light to the first prism, and the first prism is configured to direct the light received from the first prism to the second arc of phosphor.

12. The wheel of claim 10, wherein the second light direction device comprises:
    a first diffractive optical element disposed on the second surface of the wheel; and
    a second diffractive optical element disposed on the first surface of the wheel;
    wherein the second diffractive optical element is configured direct the light to the first diffractive optical element, and the first diffractive optical element is configured to direct the light received from the second diffractive optical element to the second arc of phosphor.

13. The wheel of claim 9, wherein the light direction device comprises a glass wedge disposed on the first surface of the wheel opposite the first arc of phosphor, the glass wedge configured to direct the light to the first arc of phosphor.

14. The wheel of claim 9, further comprising a sector lacking the first arc of phosphor and the second arc of phosphor.

15. The wheel of claim 9, wherein the light direction device comprises:
    a first prism disposed on the second surface of the wheel; and
    a second prism disposed on the first surface of the wheel;
    wherein the second prism is configured to direct the light to the first prism, and the first prism is configured to direct the light received from the first prism to the first arc of phosphor.

16. The wheel of claim 9, wherein the light direction device comprises:
    a first diffractive optical element disposed on the second surface of the wheel; and a second diffractive optical element disposed on the first surface of the wheel;
wherein the second diffractive optical element is configured direct the light to the first diffractive optical element, and the first diffractive optical element is configured to direct the light received from the second diffractive optical element to the first arc of phosphor.

17. A projector comprising:
a wheel having a center, the wheel comprising:
   a light direction device;
   a first arc of phosphor a first distance from the center, wherein the light direction device is optically coupled to the first arc of phosphor; and
   a second arc of phosphor a second distance from the center;
first optical elements optically coupled to the wheel;
a spatial light modulator optically coupled to the first optical elements; and
second optical elements optically coupled to the spatial light modulator.

18. The projector of claim 17, wherein the first optical elements comprise:
a first fly's eye array optically coupled to the first arc of phosphor; and
a second fly's eye array optically coupled to the second arc of phosphor.

19. The projector of claim 17, wherein the second optical elements comprise an image direction device comprising:
a flat plate; and
a trapezoidal plate.

20. The projector of claim 17, further comprising a light source optically coupled to the wheel.

* * * * *